United States Patent
Tozuka

(10) Patent No.: US 11,560,490 B2
(45) Date of Patent: Jan. 24, 2023

(54) WATER-BASED INK COMPOSITION FOR BALLPOINT PEN AND WATER-BASED BALLPOINT PEN USING THE SAME

(71) Applicant: KABUSHIKI KAISHA PILOT CORPORATION, Tokyo-to (JP)

(72) Inventor: Taro Tozuka, Tokyo-to (JP)

(73) Assignee: KABUSHIKI KAISHA PILOT CORPORATION, Tokyo-to (JP)

( * ) Notice: Subject to any disclaimer, the term of this patent is extended or adjusted under 35 U.S.C. 154(b) by 316 days.

(21) Appl. No.: 16/758,478

(22) PCT Filed: Oct. 23, 2018

(86) PCT No.: PCT/JP2018/039343
§ 371 (c)(1),
(2) Date: Apr. 23, 2020

(87) PCT Pub. No.: WO2019/082888
PCT Pub. Date: May 2, 2019

(65) Prior Publication Data
US 2020/0248019 A1    Aug. 6, 2020

(30) Foreign Application Priority Data

Oct. 25, 2017  (JP) .............................. JP2017-206526
Jun. 28, 2018  (JP) .............................. JP2018-122890

(51) Int. Cl.
*C09D 11/18* (2006.01)
*C09D 11/17* (2014.01)
*B43K 7/00* (2006.01)

(52) U.S. Cl.
CPC .............. *C09D 11/18* (2013.01); *C09D 11/17* (2013.01); *B43K 7/00* (2013.01)

(58) Field of Classification Search
CPC ............ C09D 11/17; C09D 11/18; B43K 7/00
See application file for complete search history.

(56) References Cited

U.S. PATENT DOCUMENTS

| | | | |
|---|---|---|---|
| 4,786,198 A | 11/1988 | Zgambo | |
| 2004/0122129 A1* | 6/2004 | Mammen | C09D 11/16 523/160 |
| 2005/0234150 A1 | 10/2005 | Omatsu et al. | |
| 2006/0053975 A1* | 3/2006 | Shibahashi | B43K 23/12 252/586 |
| 2008/0097058 A1 | 4/2008 | Ishizuki et al. | |
| 2012/0038718 A1 | 2/2012 | Kazmaier et al. | |
| 2015/0191602 A1* | 7/2015 | Denda | C09C 1/40 106/401 |

FOREIGN PATENT DOCUMENTS

| | | | |
|---|---|---|---|
| GB | 2 022 646 | | 12/1979 |
| JP | 60-71670 | | 4/1985 |
| JP | 63-8465 | | 1/1988 |
| JP | S63207681 | * | 8/1988 |
| JP | 5-221169 | | 8/1993 |
| JP | 6-220390 | | 8/1994 |
| JP | 06220390 | * | 8/1994 |
| JP | 9-272835 | | 10/1997 |
| JP | 2000-136340 | | 5/2000 |
| JP | 2000-219839 | | 8/2000 |
| JP | 2001-64559 | | 3/2001 |
| JP | 2001-342418 | | 12/2001 |
| JP | 2002-12807 | | 1/2002 |
| JP | 2002-294132 | | 10/2002 |
| JP | 2002-294133 | | 10/2002 |
| JP | 2005-126587 | | 5/2005 |
| JP | 2005-239946 | | 9/2005 |
| JP | 2005-290237 | | 10/2005 |
| JP | 2005-298802 | | 10/2005 |
| JP | 4314653 | * | 8/2009 |
| JP | 2013-28789 | | 2/2013 |
| JP | 2016-124950 | | 7/2016 |
| JP | 2016-124951 | | 7/2016 |
| JP | 2020180197 | * | 11/2020 |
| TW | 460549 | | 10/2001 |
| WO | 2006/073149 | | 7/2006 |

OTHER PUBLICATIONS

Extended European Search Report dated Jul. 30, 2021, in corresponding European Patent Application No. 18869812.0.
International Search Report (ISR) dated Jan. 29, 2019 in International (PCT) Application No. PCT/JP2018/039343.
English translations of International Preliminary Report on Patentability and Written Opinion dated May 7, 2020 in International (PCT) Application No. PCT/JP2018/039343.
Office Action dated Aug. 30, 2022 in corresponding Taiwanese Patent Application No. 107137681, with English translation.

* cited by examiner

*Primary Examiner* — J C Jacyna
(74) *Attorney, Agent, or Firm* — Wenderoth, Lind & Ponack, L.L.P.

(57) ABSTRACT

The present invention provides a water-based ink composition for a ballpoint pen that is less likely to cause bleeding of a written trace in writing, provides a favorable written trace without causing no blurring or line splitting, and excels in the storage stability of the ink composition; and a water-based ballpoint pen using the ink composition.

A water-based ink composition for a ballpoint pen comprising water, a coloring agent, a copolymer having a specific structure; and a water-based ballpoint pen using the ink composition.

14 Claims, No Drawings

WATER-BASED INK COMPOSITION FOR BALLPOINT PEN AND WATER-BASED BALLPOINT PEN USING THE SAME

TECHNICAL FIELD

The present invention relates to a water-based ink composition for a ballpoint pen and a water-based ballpoint pen. More specifically, the present invention relates to a water-based ink composition for a ballpoint pen and a water-based ballpoint pen that excel in writing performance.

BACKGROUND ART

Water-based ink compositions for a ballpoint pen that use a crosslinking type acrylic acid polymer as a shear-thinning imparting agent have been disclosed (for example, Patent Literatures 1 to 3).

This type of ink has a high viscosity during rest, at which shear stress is not applied, and is maintained stable in the mechanism, whereas during writing, the viscosity of the ink in the vicinity of a ball is decreased by high shear force generated due to high speed rotation of the ball, and as a result, the ink is discharged from the gap between the ball and a ball accommodation part and transferred to a paper surface. When the ink transferred to the paper surface is released from the shear force, the ink again becomes a state of being high viscosity, and thus generation of bleeding of the written trace, which is the drawback of conventional water-based ink compositions, can be improved. Further, such a type of ink is widely applied due to its many following advantages: the ink can be used up without retention of the ink, that is, a filling material, due to the above-described shear thinning property; and a flow-controlling member that controls the ink flow amount (for example, a retention member for temporarily storing the ink, such as a comb-shaped member) is not required, and therefore writing instrument having a simple structure can be obtained.

However, a further improvement in the effect of suppressing generation of bleeding after transferring to the paper surface has been desired. Further, when conventionally known crosslinking type acrylic acid polymers are used as a shear-thinning imparting agent, the viscosity during rest can be made high due to chemical bonds of the cross-linking parts; however, the ink viscosity cannot be made lower than a predetermined value due to the influence of the crosslinking parts at the time of decreasing the viscosity by shear force, and therefore blurring of the written trace or skipping of the written trace, that is, line splitting occurs upon using as a water-based ink composition for writing instrument, and improvement has been desired.

CITATION LIST

Patent Literatures

Patent Literature 1: JP 2000-136340 A
Patent Literature 2: JP 2001-64559 A
Patent Literature 3: JP 2002-294132 A

SUMMARY OF INVENTION

Technical Problem

The present invention provides a water-based ink composition for a ballpoint pen that is less likely to cause bleeding of written trace, causes no blurring or line splitting in writing, achieves favorable written trace, excels in storage stability of the ink composition, further enhances a written trace drying property, and achieves favorable feeling of writing, and a water-based ballpoint pen using the ink composition.

Solution to Problem

As a result of the diligent study to solve the problems, the present inventor found that the problems can be solved by a water-based ink composition for a ballpoint pen comprising water, a coloring agent, and a specific copolymer, and thus completed the present invention.

That is, the water-based ink composition for a ballpoint pen according to the present invention comprises;
water;
a coloring agent; and
a copolymer obtained by copolymerizing a monomer represented by the following formula (1) and a monomer represented by the following formula (2):

[Chemical Formula 1]

(1)

(wherein $R^1$ is hydrogen or a methyl group)

[Chemical Formula 2]

(2)

(wherein $R^2$ is hydrogen or a methyl group, and $R^3$ is a linear or branched alkyl group having 1 to 5 carbon atoms).

Further, the water-based ballpoint pen according to the present invention includes the above-described water-based ink composition for a ballpoint pen.

Advantageous Effects of Invention

According to the present invention, use of a copolymer having a specific structure decreases the ink viscosity compared to the prior art when shear stress is applied, and causes no blurring or line splitting of the written trace, thus allowing a favorable written trace to be maintained. Meanwhile, in the copolymer, alkyl groups generate reversible physical bonds due to intermolecular forces, whereby the ink viscosity during rest can be maintained high, thus providing excellent effects of preventing bleeding of the written trace and enhancing the storage stability of the ink.

Further, inclusion of a specific surfactant enhances permeability to a paper surface, and this enhances the written trace drying property and the lubricity, and therefore an excellent effect of achieving a favorable feeling of writing, or the like can be achieved.

DESCRIPTION OF EMBODIMENTS

<Water-Based Ink Composition for a Ballpoint Pen>

The water-based ink composition for a ballpoint pen according to the present invention (hereinafter, represented by "ink composition" in some cases) comprises water, a coloring agent, and a specific copolymer.

<Copolymer>

The ink composition according to the present invention comprises a copolymer obtained by copolymerizing a monomer represented by the following formula (1) and a monomer represented by the following formula (2) (hereinafter, simply referred to as a copolymer in some cases).

[Chemical Formula 3]

(wherein $R^1$ is hydro en or a methyl group)

[Chemical Formula 4]

(wherein $R^2$ is hydrogen or a methyl group, and $R^3$ is a linear or branched alkyl group having 1 to 5 carbon atoms).

In the present invention, a copolymer having a specific structure is used. This copolymer functions as a shear-thinning imparting agent. The copolymer used for the present invention has a carboxylic acid group and a carboxylic acid ester. In the copolymer having a specific structure according to the present invention, the alkyl groups having 1 to 5 carbon atoms in the carboxylic acid ester are a hydrophobic group, and therefore aggregation of the alkyl groups due to intermolecular force between hydrophobic groups forms reversible physical bonds to form a network in the ink composition, that is, functions like a bonding point. Therefore, the viscosity during rest becomes high. Then, when shearing is applied, the physical bonds of parts working like the bonding point are dissociated and thereby the ink viscosity is decreased. As described above, the reversible action of aggregation and dissociation of alkyl groups yields a larger viscosity gradient during rest and during writing compared to the prior art, and therefore favorable stability and writability can be achieved. That is, when the ink composition is used for a ballpoint pen, the viscosity during writing decreases compared to the prior art, which allows favorable writing without causing blurring, line splitting or the like. In addition, the ink viscosity during rest relative to the viscosity during writing becomes higher than the prior art, and therefore the viscosity of the ink after writing is recovered to the viscosity during rest and bleeding of the written trace is suppressed. When solid substances such as pigments are further used for the ink composition, dispersion is stably maintained, which allows prevention of precipitation of pigments and the like. As a result, storage stability of the ink is enhanced. Meanwhile, in the conventional crosslinking type acrylic acid, crosslinking parts form irreversible chemical bonds to form a network, and therefore the bonds of the crosslinking parts are not dissociated even when shearing is applied, although the ink viscosity during rest becomes high. Thus, the ink viscosity when shearing is applied is higher compared to a case of using the copolymer used for the invention of the present application. Accordingly, when the ink composition is used for a ballpoint pen, there may be influences on the written trace, such as blurring or line splitting of the written trace, or the like. Use of the ink composition according to the invention of the present application allows the conventional problems to be solved.

The copolymer used for the present invention is a copolymer obtained by copolymerizing a monomer represented by formula (1) and a monomer represented by formula (2), and is a (meth)acrylic acid-(meth)acrylic acid ester copolymer. In the present invention, (meth)acrylic means including both acrylic and methacrylic. Specific examples of the (meth)acrylic acid-(meth)acrylic acid ester copolymer include an acrylic acid-acrylic acid ester copolymer, a methacrylic acid-acrylic acid ester copolymer, an acrylic acid-methacrylic acid ester copolymer, a methacrylic acid-methacrylic acid ester copolymer, an acrylic acid-methacrylic acid-acrylic acid ester copolymer, an acrylic acid-methacrylic acid-methacrylic acid ester copolymer, an acrylic acid-acrylic acid ester-methacrylic acid ester copolymer, a methacrylic acid-acrylic acid ester-methacrylic acid ester copolymer, and an acrylic acid-acrylic acid ester-methacrylic acid-methacrylic acid ester copolymer. As the copolymer used for the present invention, copolymers such as random copolymers, or block copolymers may be used. These copolymers may be used alone, or two or more types thereof may be used.

Further, $R^3$ of the copolymer is a linear or branched alkyl group having 1 to 5 carbon atoms, and when the number of carbon atoms is more than 5, the steric hindrance of the alkyl group becomes large and the aggregation force between alkyl groups is lowered. Moreover, when the number of carbon atoms is more than 5, the hydrophobicity of the alkyl group increases, and therefore separation and precipitation partially occur, causing nonuniformity in some cases. Thus, stability in the ink composition tends to be inferior. When the number of carbon atoms is within a range of 1 to 5, the aggregation force between alkyl groups highly works and the alkyl groups are physically bonded to form a network between molecules, which is preferable. Further, an alkyl group having a straight chain has a smaller steric hindrance compared to an alkyl group having a side chain, which is preferable. In particular, in a case where $R^3$ is a methyl group having 1 carbon atom or an ethyl group having 2 carbon atoms, the hydrophobic force is not large, and therefore it becomes possible to design the amount of alkyl group introduced in the molecule to a relatively large amount. Increasing the amount of alkyl group to be introduced allows many physical bonding points between alkyl groups to be arranged, thus yielding the effects of further increasing the viscosity during rest and decreasing the viscosity during shearing, which is particularly preferable.

Additionally, the ratio of carboxylic acid to carboxylic acid ester of the copolymer obtained by copolymerizing the monomer represented by formula (1) and the monomer represented by formula (2) is 1:0.05 to 1:10, more preferably 1:0.1 to 1:5, and even more preferably 1:0.3 to 1:3 in terms of molar ratio. When the ratio of the carboxylic acid ester is too small, the physical bonding effect of the alkyl group is insufficient, and the thickening property or the viscosity gradient during rest and during shearing tend to becomes small, whereas when the ratio of the carboxylic acid ester is too large, the hydrophobicity of the copolymer increases, which may cause partial separation or precipitation. When the ratio of carboxylic acid to carboxylic acid ester is within this range, a high viscosity during rest and a low viscosity during shearing can be achieved, which is particularly preferable.

Further, the copolymer obtained by copolymerizing the monomer represented by formula (1) and the monomer represented by formula (2) may also be a copolymer obtained by copolymerizing a monomer derived from acrylic acid, that is, a monomer derived from acrylic acid or an ester thereof, and a monomer derived from methacrylic acid, that is, methacrylic acid or an ester thereof. In such a case, the ratio of repeating unit derived from acrylic acid to repeating unit derived from methacrylic acid is preferably 1:0.01 to 1:5, more preferably 1:0.05 to 1:2, and particularly preferably 1:0.1 to 1:1.5 in terms of molar ratio. When the ratio of the repeating unit derived from methacrylic acid is too large, the hydrophobicity of the copolymer increases, which may cause partial separation or precipitation. When the ratio of repeating unit derived from acrylic acid to repeating unit derived from methacrylic acid is within this range, a high viscosity during rest and a low viscosity during shearing can be achieved, which is particularly preferable.

Note that, the copolymer obtained by copolymerizing the monomer represented by formula (1) and the monomer represented by formula (2) comprises:

a repeating unit represented by formula (i) below:

[Chemical Formula 5]

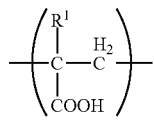

(i)

(wherein $R^1$ is hydrogen or a methyl group); and
a repeating unit represented by formula (ii) below:

[Chemical Formula 6]

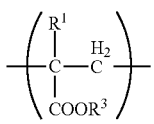

(ii)

(wherein $R^2$ is hydrogen or a methyl group, and $R^3$ is a linear or branched alkyl group having 1 to 5 carbon atoms).

Further, the ratio of the number of repeating unit in formula (1) to the number of repeating unit of formula (ii) is 1:0.05 to 1:10, more preferably, 1:0.1 to 1:5, and even more preferably 1:0.3 to 1:3 in terms of number ratio. When the ratio of the repeating unit of formula (ii) is too small, the physical bonding effect of the alkyl group becomes insufficient, and the thickening property or the viscosity gradient during rest and during shearing tends to become small, whereas when the ratio of the carboxylic acid ester is too large, the hydrophobicity of the copolymer increases, which may cause partial separation or precipitation. When the ratio of carboxylic acid to carboxylic acid ester is within this range, a high viscosity during rest and a low viscosity during shearing can be achieved, which is particularly preferable.

Note that, the condition for copolymerization is not particularly limited, and publicly known polymerization conditions can be appropriately applied. For example, polymerization can be performed by dissolving each monomer in a solvent, then adding a polymerization initiator to the solution and reacting them under the heating condition.

The mass average molecular weight of the copolymer used for the present invention is preferably 1,000 or more, more preferably 5,000 or more, and even more preferably 20,000 or more. When the mass average molecular weight is smaller than the above-described range, there is a possibility that a sufficient viscosity is less likely to be expressed. In addition, the mass average molecular weight is preferably 1,000,000 or less, more preferably 700,000 or less, and even more preferably 600,000 or less. When the mass average molecular weight is larger than the above-described range, there is a possibility that the viscosity during high shearing is too high. Herein, the mass average molecular weight is the mass average molecular weight in terms of polystyrene, and can be measured by gel permeation chromatography using polystyrene as a standard.

As the blended amount of the copolymer used for the present invention, the copolymer can be used in a range of 0.01 to 10 mass % based on the total mass of the ink composition. The blended amount is preferably in a range of 0.05 to 5 mass %, and more preferably 0.1 to 2 mass %. When the blended amount is larger than this range, the viscosity during rest becomes high, which enhances the dispersion stability of the ink composition and also prevents bleeding of written trace; however, the ink viscosity during shearing tends to slightly become high, and the writing performance shows a tendency to be slightly decreased. When the blended amount is smaller than this range, the ink viscosity during shearing decreases, and written trace shows a tendency to be bled although there is no blurring or line splitting of the written trace. When the blended amount is within the range, excellent ink stability and writing performance can be achieved while maintaining the dispersion stability of the ink composition without causing blurring or line splitting in writing and bleeding of the written trace, which is preferable.

<Crosslinking Agent>

In the ink composition according to the present invention, a crosslinking agent can be used. The crosslinking agent used for the present invention is a compound that can form a reversible physical crosslink with the copolymer used for the present invention and that can express van der Waals's intermolecular aggregation force with the alkyl groups of ester of the copolymer used for the present invention. It is a compound in which, when the ink composition is in a state of being rest, the crosslinking agent forms crosslinking points via physical bonding with the alkyl groups of the copolymer used for the present invention, and a strong network can be formed with the copolymer used for the present invention and the crosslinking agent; and when a shear force is applied to the ink composition, the physical bonding at the crosslinking points is easily dissociated.

In the crosslinking agent, the alkyl group form a physical crosslinking with the alkyl group of the copolymer used for the present invention as described above, which yields the effect of increasing crosslinking points and complementing the intermolecular distance or the intermolecular density for the alkyl group of the copolymer used for the present invention compared to a case of using the copolymer used for the present invention alone, and therefore the crosslinking agent can form a further strong network. Accordingly, the ink composition comprising the copolymer used for the present invention and the crosslinking agent can further enhance the ink viscosity during rest compared to a case of using the copolymer used for the present invention alone. Further, since the crosslinking point is a physical bond, when shearing is applied, respective physical bonds are dissociated and the viscosity of the ink composition is decreased to be lower viscosity compared to the ink composition using conventional shear-thinning imparting agents such as crosslinking type acrylic acid, or the ink composition using the copolymer used for the present invention alone, resulting in further increased viscosity gradient during rest and during shearing. Moreover, even when the amount of the copolymer used for the present invention is small, the effect of expressing a high viscosity can be obtained. As a result, enhancement of performance as the ink composition can be achieved, such as enhancement of storage stability of the ink composition, or enhancement of the writability when the ink composition is used for a water-based ballpoint pen.

Specific examples of the crosslinking agent used for the present invention include alkyl-modified glucose, polyoxyethylene sorbitan fatty acid ester, polyoxyethylene fatty acid ester, alkyl-modified polyethylene oxide, phenyl-modified polyethylene oxide, and phenyl alkyl-modified polyethylene oxide. The crosslinking agent can provide effects even when either a polymer compound or a low molecular weight compound that contains an alkyl group is used; however, the viscosity during shearing tends to be lower in a case of using the low molecular weight compound, and therefore the viscosity gradient during rest and during shearing can be made high, which is preferable. As the alkyl group, an alkyl group having 1 to 30 carbon atoms, preferably 1 to 22 carbon atoms, and more preferably 1 to 18 carbon atoms is used. In particular, in a case where the number of carbon atoms of the alkyl groups are the same, use of a compound that causes less steric hindrance enhances the effects thereof, which is preferable.

<Coloring Agent>

The coloring agent that can be used in the present invention is not particularly limited to dyes, pigments, and the like, and can be appropriately selected and used.

The dye that can be used in the present invention is not particularly limited as long as it can be dissolved or dispersed in an aqueous media. Examples thereof include various types of dyes, such as acid dyes, basic dyes, reactive dyes, direct dyes, dispersed dyes, and food dyes, and these can be used alone, or two or more types thereof can be used in combination. The added amount of the dye is preferably 0.1 to 10 mass %, and more preferably 0.1 to 5 mass % based on the total mass of the ink composition.

Specific examples of the acid dyes include such as C.I. Acid Red 18, C.I. Acid Red 51, C.I. Acid Red 52, C.I. Acid Red 87, C.I. Acid Red 92, C.I. Acid Red 289, C.I. Acid Orange 10, C.I. Acid Yellow 3, C.I. Acid Yellow 7, C.I. Acid Yellow 23, C.I. Acid Yellow 42, C.I. Acid Green 3, C.I. Acid Green 16, C.I. Acid Blue 1, C.I. Acid Blue 9, C.I. Acid Blue 22, C.I. Acid Blue 90, C.I. Acid Blue 239, C.I. Acid Blue 248, C.I. Acid Violet 15, C.I. Acid Violet 49, C.I. Acid Black 1, and C.I. Acid Black 2; basic dyes such as C.I. Basic Orange 2, C.I. Basic Orange 14, C.I. Basic Green 4, C.I. Basic Blue 9, C.I. Basic Blue 26, C.I. Basic Violet 1, C.I. Basic Violet 3, and C.I. Basic Violet 10; direct dyes such as C.I. Direct Red 28, C.I. Direct Yellow 44, C.I. Direct Blue 86, C.I. Direct Blue 87, C.I. Direct Violet 51, and C.I. Direct Black 19; and food dyes such as C.I. Food Yellow 3, and C.I. Food Black 2.

Examples of the pigment that can be used in the present invention include such as inorganic, organic, processed pigments, and specific examples thereof include such as carbon black; aniline black; ultramarine blue; chrome yellow; titanium oxide; iron oxide; phthalocyanine-based, azo-based, quinacridone-based, quinophthalone-based, triphenylmethane-based, perinone-based, perylene-based, and dioxazine-based pigments; aluminium pigments; pearl pigments; fluorescent pigments; phosphorescent pigments; and complementary color pigments. As the other colored resin particles, microcapsule pigments, in which coloring components obtained by dispersing pigments in a medium, are encapsulated or dissolved as a solid solution in a shell formed from resin wall film forming substances by a publicly known microencapsulation method or the like, or microcapsule pigments that include functional materials such as, liquid crystals, reversible thermochromic compositions, and photochromic materials may be used. Further, colored resin particles in which pigments are covered with resin such as transparent or translucent resin, or substances in which colored resin particles or colorless resin particles are colored with pigments or dyes can also be used, for example. These dyes and pigments may be used alone, or two or more types thereof may be used in combination. The content thereof is preferably 1 mass % to 20 mass % based on the total amount of the ink composition. As described above, in the present invention, when pigments are used as the coloring agent, the dispersion is stably maintained, and therefore a particularly high effect such as prevention of precipitation of pigments or the like can be obtained.

Moreover, pigments, which are conventionally dispersed in the ink composition, tend to be inferior in permeability to the paper surface compared to dyes, and are therefore difficult to enhance the written trace drying property. However, in the present invention, the written trace drying property can be enhanced by using a surfactant described later even in a case where pigments are used as a coloring agent. Further, pigments excel in water resistance and light resistance, and can provide favorable coloring. In view of the above, pigments are preferably used as the coloring agent.

<Water>

Water is not particularly limited, and for example, ion exchanged water, ultrafiltration water, distilled water, or the like can be used.

<Others>

The ink composition according to the present invention may also comprise various types of additives such as water-soluble organic solvents, pH adjusters, moisturizers, anti-corrosive agents, antiseptics, thickeners, and other shear-thinning imparting agents for the purpose of enhancing an ink physical property or functions in a range that do not impair the performance of the present invention.

Further, fluorinated surfactants, or nonionic, anionic, or cationic surfactants to enhance the permeability of the solvent, and antifoaming agents such as dimethylpolysiloxane can also be added.

A written trace drying property can be enhanced by using, as the surfactant, a surfactant having an acetylene bond in its structure or a silicone-based surfactant. A more preferred effect can be obtained by using the surfactant in combination with the copolymer used for the invention of the present application. In other words, use of the copolymer used for the present invention decreases the viscosity of the ink composition during shearing during writing more than conventional crosslinking type acrylic acid polymers, and thus allows the ink composition to be more quickly permeated to paper fiber (paper surface) than the prior art. Further, it is conceived that the surfactant having an acetylene bond or the silicone-based surfactant provide a synergistic effect of the permeation promotion effect described later and the effect of the copolymer used for the present invention, and further enhances the permeability to a paper surface. As a result, the above-described component in the ink composition decreases the viscosity of the ink composition and also functions to enhance the permeability, thus making the written trace drying property higher.

<Surfactant Having an Acetylene Bond in its Structure>

The surfactant having an acetylene bond in its structure used for the ink composition of the present invention preferably has a number of moles of ethylene oxide added of 10 or less.

The surfactant having a number of moles of ethylene oxide added of 10 or less and having an acetylene bond in its structure is a surfactant that has an acetylene bond to which ethylene oxide is added in its structure, and in which the number of moles of ethylene oxide added in the surfactant is 10 or less. Example thereof include acetylenic glycol-based surfactants having a number of moles of ethylene oxide added of 10 or less, and acetylenic alcohol-based surfactants having a number of moles of ethylene oxide added of 10 or less.

The surfactant having a number of moles of ethylene oxide added of 10 or less and having an acetylene bond in its structure can significantly enhance the permeability to the paper surface. Thus, the ink composition comprising the surfactant having an acetylene bond in its structure can be quickly permeated to paper, and the time until the obtained written trace has completely dried is reduced, and as a result, the ink composition excels in written trace drying property which can prevent a paper surface or written trace itself from being smeared. In particular, combined use of the copolymer used for the present invention and the surfactant having a number of moles of ethylene oxide added of 10 or less and having an acetylene bond in its structure yields an effect of further enhancing the written trace drying property, which is effective.

Although the reason is not clear, this is because the surfactant having a number of moles of ethylene oxide added of 10 or less and having an acetylene bond in its structure exhibits a favorable balance of hydrophobicity and hydrophilicity for exerting a permeation effect.

To allow the ink composition to be quickly permeated to paper surface after writing, the surface tension of the ink composition after writing needs to be suitably controlled. To control the surface tension in association with writing action, that is, dynamic surface tension is instantly and obtain quick permeability to a paper surface, the behavior of the molecules of the surfactant in the ink is important. Use of a surfactant having a specific structure allows the molecules of the surfactant to be quickly arranged on the gas-liquid interface under the dynamic condition, and also allows instant and effective controlling of the surface tension, and therefore an ink composition having an excellent written trace drying property can be obtained.

When the hydrophilicity of the surfactant having an acetylene bond in its structure is too high, the solubility of the surfactant in the ink composition becomes too high, thus precluding quick arrangement of the molecules of the surfactant relative to the gas-liquid interface, and therefore the permeability to a paper surface is less likely to be enhanced. In contrast, when the hydrophobicity of the surfactant having an acetylene bond in its structure is too high, the solubility of the surfactant in the ink composition becomes too low, and thereby the stability to the ink composition such as separation tends to be inferior as well as the permeability to a paper surface is less likely to be enhanced.

In the surfactant having a number of moles of ethylene oxide added of 10 or less and having an acetylene bond in its structure, a favorable balance of hydrophilicity and hydrophobicity is maintained, and use of this surfactant allows the molecules of the surfactant to be appropriately arranged on the gas-liquid interface, thereby controlling the surface tension of the ink composition and enhancing the permeability of the ink composition to paper. Accordingly, it is presumed that the ink composition comprising the surfactant having a number of moles of ethylene oxide added of 10 or less and having an acetylene bond in its structure enhances the permeability to the paper surface and can exhibit an excellent written trace drying property.

Further, the surfactant having a number of moles of ethylene oxide added of 10 or less and having an acetylene bond in its structure provides the effect of enhancing a feeling of writing, such as providing a smooth feeling of writing as well as enhancing a written trace drying property. This is because inclusion of the surfactant having an acetylene bond in its structure in the ink composition enhances the lubricity between the ball and the ball point pen tip of the ballpoint pen, and also allows suppression of the wear of the ball seat.

Note that, the ink composition comprising the surfactant having the acetylene bond in its structure of the present invention can contain other lubricants, but in particular, among these lubricants, it is preferable to use in combination with a phosphoric acid ester-based surfactant described later.

Note that, in the present invention, the number of moles of ethylene oxide added of the surfactant having an acetylene bond in its structure is preferably 10 or less, and this is because when the number of moles of ethylene oxide added is more than 10, the hydrophilicity becomes too high, and the solubility also becomes high, and thereby quick arrangement of the surfactant to the interface tends to be impeded and enhancement of the written trace drying property tends to be limited. Further, considering enhancement of the effect by the surfactant having an acetylene bond in its structure, the number of moles of ethylene oxide added is preferably 8 or less. Moreover, the number of moles of ethylene oxide added is preferably 4 or more. When the number of moles of ethylene oxide added is 4 or more, it is possible to prevent a situation where the solubility decreases and the surfactant becomes difficult to be stably present in the ink composition, resulting in decreased effect of the surfactant over time.

In addition, propylene oxide may be further added to the surfactant having an acetylene bond in its structure used for the present invention. Considering enhancement of the written trace drying property or the stability of the ink composition over time, in the present invention, a surfactant having an acetylene bond in its structure, to which propylene oxide is further added in addition to ethylene oxide, is preferably selected and used. This is because, in a case where two of ethylene oxide and propylene oxide are added to the surfactant having an acetylene bond in its structure, the balance of hydrophobicity and hydrophilicity is further suitably maintained.

As described above, to obtain the effect of the surfactant has an acetylene bond in its structure, it is preferred to suitably maintain the balance of hydrophilicity and hydrophobicity thereof.

The surfactant having an acetylene bond in its structure, to which both ethylene oxide and propylene oxide are added, is likely to more suitably maintain the balance of hydrophilicity and hydrophobicity, and therefore when this surfactant is used, molecules of the surfactant are quickly arranged on the gas-liquid interface while being remarkably stable in the ink composition. As a result, the surface tension of the ink composition is quickly controlled, and the permeability of the ink composition to paper tends to be quickly enhanced. Accordingly, in the present invention, use of the surfactant having an acetylene bond in its structure, to which both ethylene oxide and propylene oxide are added, further enhances the written trace drying property and can also provide an ink composition having excellent ink stability over time, which is preferable.

The ratio of the number of moles of ethylene oxide added and the number of moles of propylene oxide added preferably satisfies the relationship such that the number of moles of ethylene oxide added:the number of moles of propylene oxide added=1:1 to 5:1, considering suitably maintaining the balance of hydrophobicity and hydrophilicity of the surfactant having an acetylene bond in its structure and further enhancing the written trace drying property.

Further, considering arrangement on the gas-liquid interface, the total of the number of moles of ethylene oxide added and the number of moles of propylene oxide added is preferably 10 or less. When the number of moles added is too large, the molecules of the surfactant are too long, and this tends to cause the steric hindrance to the gas-liquid interface during arrangement, whereas when the total number of moles added is 10 or less, the balance of hydrophobicity and hydrophilicity of the surfactant is suitably maintained, and the effect considering the influence of the steric hindrance on the gas-liquid interface during arrangement is obtained, which is particularly preferable.

Further, considering enhancement of the written trace drying property or the stability of the ink composition over time, a surfactant having an acetylene bond in its structure, in which the number of moles of ethylene oxide added is 5 and the number of moles of propylene oxide added is 2, is more preferably used.

Further, the HLB value of the surfactant having an acetylene bond in its structure is preferably 3 to 14, more preferably 6 to 12, and particularly preferably 7 to 9. When the HLB value of the surfactant having an acetylene bond in its structure is 3 or more, the surfactant can be stably present without remaining unsolved in water as a solvent, and effects can obtained at an initial stage and over time, which is preferable; and when the HLB value is 14 or less, it tends to become a state in which arrangement is facilitated in the vicinity of the gas-liquid interface due to hydrophobicity, and the effect provided by the surfactant, such as enhancement of the written trace drying property can be instantly obtained with a small amount, which is preferable.

Examples of the surfactant having an acetylene bond in its structure include acetylenic alcohol-based surfactants and acetylenic glycol-based surfactants for example, and considering a tendency for the permeability to the paper surface to be enhanced and a tendency for the written trace drying property to be enhanced, acetylenic glycol-based surfactants are preferably used.

Specific example of the surfactant having an acetylene bond in its structure include Olfine series (available from Nissin Chemical Industry Co., Ltd.), Surfynol series, and Dynol series (both are available from Air Products and Chemicals, Inc.).

<Silicone-Based Surfactant>

For the silicone-based surfactant, controlling the balance of the Si backbone, the hydrophobic group such as propylene oxide, and the hydrophilic group such as ethylene oxide in the structure and making a suitable condition, allows the molecules of the surfactant to quickly arrange on the gas-liquid interface while being stable in the ink composition, and this allows quick control of the surface tension of the ink composition during writing to enhance the permeability, and thereby an excellent ink composition that achieve both the written trace drying property and the stability of the ink composition over time can be easily obtained. Among silicone-based surfactants, one having a mass average molecular weight of 500 to 3000 is preferred. This is because, for the arrangement of the above-described surfactant on the gas-liquid interface, when the mass average molecular weight exceeds 3000, molecules of the silicone-based surfactant become too large, arrangement on the gas-liquid interface tends to be retarded accordingly, and therefore there may be a case where the written trace drying property is not sufficient. Meanwhile, when the mass average molecular weight is 3000 or less, molecules of the silicone-based surfactant become relatively small, whereby the arrangement of the molecules of the surfactant on the gas-liquid interface tends to be quickly performed and the written trace drying property tends to be enhanced. Further, this is because when the mass average molecular weight is less than 500, a desired written trace drying property is difficult to obtain. Considering the above-described effects, the mass average molecular weight is preferably 500 to 3000, and the mass average molecular weight is more preferably 500 to 2000; and further considering, the mass average molecular weight is preferably 1000 to 2000.

Further, the silicone-based surfactant provides the effect of enhancing a feeling of writing such as providing a smooth feeling of writing as well as enhancement of a written trace drying property. This is because inclusion of the silicone-based surfactant in the ink composition enhances the lubricity between the ball and the ball point pen tip of the ballpoint pen, and also allows suppression of the wear of the ball seat.

Note that, the ink composition comprising the silicone-based surfactant of the present invention may contain other lubricants, and particularly, among lubricants, it is preferred to use in combination with a phosphoric acid ester-based surfactant described later.

As for the solubility parameter of the silicone-based surfactant (hereinafter, the SP value), considering the written trace drying property, the SP value is preferably 8 to 13; and further considering, the SP value is preferably 9 to 12, and further, the SP value is particularly preferably 10 to 11. The SP value of water which is the main component of the solvent is 23.4, and when the SP value of the silicone-based surfactant is too close to this value, the silicone-based surfactant is stabilized in a state of being dissolved, and therefore molecules of the surfactant tend to become difficult to quickly arrange on the gas-liquid interface. When the SP value is within the above-described range, molecules of the surfactant are likely to be quickly arranged on the gas-liquid interface, and the stability in the ink composition can be obtained, which is preferable.

Specific examples of the silicone-based surfactant include SILFACE series (available from Nissin Chemical Industry Co., Ltd.), BYK series (available from BYK Chemie Co., Ltd.), Silsoft Spread series, and Coatosil series (both are available from Momentive Performance Materials Inc.). These can be used alone, or two or more types thereof can be mixed and used.

Further, the total content of the surfactant having an acetylene bond in its structure or the silicone-based surfactant is more preferably 0.01 to 3.0 mass % based on the total mass of the ink composition. This is because when the total content of the surfactant having an acetylene bond in its structure or the silicone-based surfactant is less than 0.01 mass %, a desired written trace drying property is difficult to obtain, and when the total content exceeds 3.0 mass %, the stability of the ink composition over time tends to be influenced. Moreover, further considering, the total content is preferably 0.05 to 2.0 mass %, and particularly preferably 0.1 to 1.5 mass %.

Further, a water-soluble solvent is used in consideration of the dissolution stability of water, prevention of moisture vaporization and drying, or the like. Examples of the water-soluble organic solvent include (i) glycols such as ethylene glycol, diethylene glycol, triethylene glycol, propylene glycol, polyethylene glycol, or glycerin; (II) alcohols such as methanol, ethanol, 1-propanol, 2-propanol, isopropanol, isobutanol, t-butanol, propargyl alcohol, allyl alcohol, 3-methyl-1-butyne-3-ol, ethylene glycol monomethyl ether acetate, or other higher alcohols; and (iii) glycol ethers such as ethylene glycol monomethyl ether, ethylene glycol monoethyl ether, 3-methoxybutanol, or 3-methoxy-3-methylbutanol. These can be used alone, or two or more types thereof can be mixed and used.

The added amount of the water-soluble organic solvent is preferably 0.1 to 25 mass %, and more preferably 5 to 20 mass % based on the ink composition.

Further, for the water-soluble solvent, a water-soluble solvent having a SP value that is different from the SP value of the surfactant having an acetylene bond in its structure and the silicone-based surfactant is preferably used. This is because when the SP value of the water-soluble solvent and the SP value of the silicone-based surfactant are close, the silicone-based surfactant is stabilized in a state of being dissolved, and therefore molecules of the surfactant tend to become difficult to quickly arrange on the gas-liquid interface. Thus, use of a water-soluble solvent having a SP value that is different from the SP value of the silicone-based surfactant allows quick arrangement of the molecules of the surfactant on the gas-liquid interface and also allows the stability in the ink composition, which is preferable. Further considering the stability in the ink composition, the difference between the SP value of the silicone-based surfactant and the SP value of the water-soluble solvent is preferably 1 or more, and further considering, the difference is preferably 3 or more.

Examples of the pH adjuster include inorganic salts such as ammonia, sodium carbonate, sodium phosphate, sodium hydroxide, and sodium acetate; organic basic compounds including water-soluble amine compounds such as triethanolamine and diethanolamine; lactic acid; and citric acid. The added amount of the pH adjuster is preferably 0.1 to 25 mass %, and more preferably 5 to 20 mass % based on the ink composition.

Examples of the moisturizer include urea, or sorbit other than the water-soluble organic solvent. The added amount of the moisturizer is preferably 0.1 to 10 mass %, and more preferably 0.1 to 5 mass % based on the ink composition.

Examples of the anticorrosive agent include benzotriazole and the derivative thereof, tolyltriazole, dicyclohexylammonium nitrite, diisopropylammonium nitrite, sodium thiosulphate, saponin, or dialkyl thiourea.

Examples of the antiseptic include 2-methyl-4-isothiazoline-3-one, 1,2-benzisothiazolin-3-one, 2-n-octyl-4-isothiazolin-3-one, 2-methyl-4,5-trimethylene-4-isothiazolin-3-one, N-(n-butyl)-1,2-benzisothiazolin-3-one, 2-pyridinethiol-1-oxidesodium, 3-iodo-2-propynylbutylcarbamate sodium benzoate, benzotriazole, and phenol.

Further, as a water-soluble resin, for example, acrylic resin, alkyd resin, cellulose derivatives, polyvinylpyrrolidone, and polyvinyl alcohol can be used. Further, as a resin emulsion, an emulsion containing, for example, acrylic resin, urethane resin, styrene-butadiene resin, polyester resin, and vinyl acetate resin can be added.

In addition, a lubricant is preferably used in order to enhance a feeling of writing and facilitate suppression of the wear of the ball seat by way of smoothing the rotation of the ball through enhancement of the lubricity. Examples of the lubricant include fatty acid, alkylbenzene sulfonic acid, phosphoric acid ester, amino acid, N-acylamino acid, aliphatic amide alkylene oxide adducts, terpenoid acid derivatives, and salts thereof. Specific examples include oleic acid, stearic acid, linoleic acid, linolenic acid, ricinoleic acid, dodecylbenzenesulfonic acid, polyoxyethylene alkylether phosphoric acid ester, polyoxyethylene alkylphenylether phosphoric acid ester, alanine, glycine, lysine, threonine, serine, proline, sarcosine, N-acyl sarcosine, polyoxyethylene fatty acid amide, and salts thereof. In particular, phosphoric acid ester are preferably used. This is because adsorption of phosphate groups to metal further enhances the lubricity and the feeling of writing, thus facilitating suppression of the wear of the ball seat. Example of the type of phosphoric acid ester include styrenated phenol-based, nonylphenol-based aromatic phosphoric acid ester or the like; and lauryl alcohol-based, tridecyl alcohol-based, octyl phenol-based, hexanol-based aliphatic phosphoric acid ester or the like. Among them, aliphatic phosphoric acid ester-based surfactants are preferably used because inclusion of a phenyl backbone tends to cause an influence on the lubricity due to steric hindrance. The lubricant can be used alone, or two or more types thereof can be mixed and used.

Organic resin particles can be used for the ink composition of the present invention. Use of the organic resin particles allows suppression of ink dripping. Examples of the organic resin particles that can be used in the present invention include particles of olefin resins such as polyethylene resin, and polypropylene resin; particles of nitrogen-containing resins which contain a nitrogen atom in the chemical structure, such as melamine-formaldehyde resin, benzoguanamine-formaldehyde resin, benzoguanamine-melamine-formaldehyde resin, urea formaldehyde resin, and nylon resin; acrylic resin particles; styrene resin particles; epoxy resin particles; urethane resin particles; and cellulose resin particles. These organic resin particles may be used alone, or two or more types thereof may be used in combination.

Among organic resin particles, olefin resin particles and nitrogen-containing resin particles are preferably used. It is presumed that the olefin resin particle, which is a hydrocarbon compound and is a nonpolar substance, tends to aggregate in water, and this aggregation structure and the copolymer are intertwined with each other, and this facilitates formation of optimal aggregation structure that does not cause defects such as an insufficient amount of ink discharge while further suppressing ink leakage. Further, olefin resin particles, which have a high melting temperature, are stably present even in a high temperature environment, and in a high pressure environment, olefin resin particles have characteristics of being likely to be deformed but less likely to be denatured, and thus can be a suitably used as an ink additive.

Examples of the material of olefin resin particles include polyolefins such as polyethylene, polypropylene, polybutene, and the mixture thereof. Among them, considering suppression of the ink leakage and enhancement of the feeling of writing, use of polyethylene is preferred, and specific examples thereof include low density polyethylenes, high density polyethylenes, low molecular weight polyethylenes, modified polyethylenes, and modified high density polyethylenes. Among them, considering the effect of suppressing ink leakage, low density polyethylenes, low molecular weight polyethylenes, and modified polyethylenes are preferred. In particular, low molecular weight polyethylenes, which have a lower melting point than the other types of polyethylenes and have a property of being soft, are preferred in that polyethylene particles are likely to be closely adhered to prevent generation of the gap between particles, thus preventing ink leakage. Further, low density polyethylene are soft, and therefore can be suitably used for enhancing the feeling of writing, for example. Olefin resin particles may contain a material other than polyolefin as necessary.

Among nitrogen-containing resin particles, those having an amino group or an imino group is preferred, and this is because when nitrogen-containing resin particles have an amino group or an imino group, they are likely to have a stable aggregation structure for a long period of time, and are likely to suppress the ink leakage. Note that, the nitrogen-containing resin particles having a functional group of an amino group or an imino group include, for example, tertiary amines, and quaternary amines.

Further, among the nitrogen-containing resin particles having an amino group or an imino group, use of nitrogen-containing resin particles having a chemically bonded three-dimensional crosslinking structure is preferred. Inclusion of the nitrogen-containing resin particles having a chemically bonded three-dimensional crosslinking structure results in a particularly excellent strength, heat resistance, solvent resistance, or the like, and therefore are stable without absorbing moisture in a water-based ink, and excel in stability over time, which is preferable. Further, this is because an aggregation structure is easily taken for a long period of time due to the stability of the nitrogen-containing resin particles themselves and the mutual hydrogen bonds between the nitrogen-containing resin particles, and ink leakage is likely to be stably suppressed. In particular, among nitrogen-containing resin particles having a crosslinking structure, resin particles having a heterocyclic structure, such as melamine-formaldehyde resin, benzoguanamine-formaldehyde resin, and benzoguanamine-melamine-formaldehyde resin, which are even less likely to absorb moisture, are stable and thus are preferable.

Examples of the nitrogen-containing resin particles having a crosslinking structure include amino resin particles, such as melamine-formaldehyde resin, benzoguanamine-formaldehyde-resin, benzoguanamine-melamine-formaldehyde resin, and urea formaldehyde resin. Further, examples of the nitrogen-containing resin particles having an amide bond include nylon resins such as nylon 6, and nylon 12; and particles of urethane resins such as polycarbonate polyurethane resin, polyether polyurethane resin, polyester polyurethane resin, and urethane urea resin.

For the shape of the organic resin particle, a particle having a spherical shape, or a particle having an irregular shape, or the like can be used, and considering the reduction of wear resistance, spherical resin particles are preferable. The spherical resin particles herein are not limited to completely spherical particles, but may be, for example, substantially spherical resin particles, or substantially ellipsoidal resin particles.

The content of the organic resin particles is more preferably 0.01 to 10.0 mass % based on the total amount of the ink composition. This is because when the content of the organic resin particles is less than 0.01 mass %, the ink leakage is difficult to be suppressed, and when the content exceeds 10.0 mass %, the aggregation structure tends to become strong, which tends to cause an influence on the feeling of writing or dry up performance. Moreover, further considering, the content is preferably 0.02 to 5.0 mass %, particularly preferably 0.03 to 1.0, and most preferably 0.05 to 0.5 mass %.

In addition, the ink composition of the present invention may comprise dextrin.

Inclusion of dextrin in the ink composition forms allows a film to be formed when the ink of the tip of the ballpoint pen is dried, and this suppresses ink leakage from the gap between the ball and the inner wall of the leading tip end and also provides the effect of enhancing dry up performance at the tip of the pen. In particular, combined use of organic resin particles and dextrin is more effective in suppressing ink leakage.

The mass average molecular weight of the dextrin is more preferably 5000 to 120000. This is because when the mass average molecular weight of dextrin exceeds 120000, the film formed on the tip of the pen is hard, and the written trace tends to be blurred in the start of writing during dry up, whereas when the mass average molecular weight is less than 5000, the hygroscopic property tends to be high, the film formed on the tip of the pen tends to be soft, and thus the effect of suppressing ink leakage is less likely to be sufficiently obtained. Further, when the mass average molecular weight is smaller than 20000, the film tends to become thin, and therefore the mass average molecular weight is particularly preferably 20000 to 120000.

The content of the dextrin is preferably 0.1 to 5 mass % based on the total mass of the ink composition. This is because when the content is less than 0.1 mass %, the effect of suppressing ink leakage and enhancing dry up performance of the tip of the pen tends not to be sufficiently obtained, and when the content exceeds 5 mass %, dextrin tends to be difficult to be dissolved in the ink composition. The content is preferably 0.1 to 3 mass % further considering the solubility in the ink, and is particularly preferably 1 to 3 mass % further considering suppression of the ink leakage or enhancement of the dry up performance.

Further, in the ink composition according to the present invention, conventionally known shear-thinning imparting agents, such as acrylic acid copolymers other than the copolymers obtained from the above-described formulae (1) and (2) can be used as the other shear-thinning imparting agents. Note that, the other shear-thinning imparting agents exhibit a small effect of enhancing the ink stability and writing characteristics, and therefore the content thereof is preferably 50 mass % or less, more preferably 30 mass % or less, and particularly preferably 10 mass % or less based on the mass of the copolymer specified in the present invention.

The viscosity gradient of the ink composition according to the present invention can be represented by a viscosity index n at 20° C. Here, the viscosity index n indicates n in the viscosity equation represented by $S=\alpha D^n$. Note that, S represents a shear stress (dyn/cm$^2$=0.1 Pa), D represents a shear rate (s$^{-1}$), and $\alpha$ represents a viscosity coefficient. The viscosity index n can be calculated by measuring the ink viscosity using an E-type rotational viscometer (DV-II+Pro, cone type rotor CPE-42, available from Brookfield Viscometers Ltd.).

<Production Method of Ink Composition>

The ink composition according to the present invention can be produced by any conventionally known method.

Specifically, the ink composition according to the present invention can be produced by blending required amounts of respective components, and mixing by various types of stirrers such as propeller stirring, a homo disper, or a homo mixer, or various types of dispersers such as a bead mill.

EXAMPLES

Hereinafter, the present invention will be further described in detail with reference to Examples, but the present invention is not limited to these Examples.

Example 1

An ink composition was obtained by the blending composition and the method described below.

(Ink Composition)

| | |
|---|---|
| Carbon black (coloring agent) | 6.0 mass % |
| Diethylene glycol (water-soluble organic solvent) | 10.0 mass % |
| Triethanolamine (pH adjuster) | 3.0 mass % |
| Phosphoric acid ester (lauryl alcohol-based lubricant) | 1.0 mass % |
| Benzotriazole (anticorrosive agent) | 0.5 mass % |
| 1,2-Benzisothiazolin-3-one (antiseptic) | 0.1 mass % |
| (Meth)acrylic acid-methyl (meth)acrylate copolymer (copolymer molar ratio of carboxylic acid to methyl ester 1:2.1 molar ratio of repeating unit derived from acrylic acid to repeating unit derived from methacrylic acid 1:0.36, mass average molecular weight: 49,000) | 0.45 mass % |
| Ion exchanged water | 79.05 mass % |

A coloring agent, water, a water-soluble organic solvent, a pH adjuster, a lubricant, an anticorrosive agent, and an antiseptic were stirred with a disper while heating, for example, to produce a base ink. Thereafter, a copolymer is charged while the produced base ink was heated, and sufficiently mixed and stirred using a homogenizer stirrer until the mixture becomes a uniform state to obtain the ink composition of Example 1. The ink viscosity of the obtained ink composition, measured using a DV-II viscometer (CPE-42 rotor), available from Brookfield Viscometers Ltd. in an environment of 20° C. under the condition of a shear rate of 1.92 $sec^{-1}$ (revolution speed: 0.5 rpm) was 2778 mPa·s; and the ink viscosity measured under the condition of a shear rate of 192 $sec^{-1}$ (revolution speed: 50 rpm) was 74 mPa·s.

Examples 2 to 25

Ink compositions were obtained in the same manner as in Example 1 except for changing the composition of the ink composition to the compositions shown in Tables 1 to 3.

Comparative Examples 1 and 2

Ink compositions were obtained in the same manner as in Example 1 except for changing the composition of the ink composition to the compositions shown in Table 3.

TABLE 1

| | | Examples | | | | | | | | |
|---|---|---|---|---|---|---|---|---|---|---|
| | | 1 | 2 | 3 | 4 | 5 | 6 | 7 | 8 | 9 |
| Coloring agent | Carbon black | 6 | 6 | 6 | 6 | 6 | 6 | 6 | 6 | 6 |
| Coloring agent | Colored resin particles | | | | | | | | | |
| | Ion exchanged water | 79.05 | 79.05 | 79.2 | 78.97 | 78.9 | 78.78 | 79.15 | 79.35 | 79.05 |
| Water-soluble organic solvent | Diethylene glycol | 10 | 10 | 10 | 10 | 10 | 10 | 10 | 10 | 10 |
| pH adjuster | Triethanolamine | 3 | 3 | 3 | 3 | 3 | 3 | 3 | 3 | 3 |
| Antiseptic | Benzotriazole | 0.5 | 0.5 | 0.5 | 0.5 | 0.5 | 0.5 | 0.5 | 0.5 | 0.5 |
| Lubricant | Phosphoric acid ester (lauryl alcohol-based) | 1 | 1 | 1 | 1 | 1 | 1 | 1 | 1 | 1 |
| Crosslinking agent | Polyoxyethylene tetraoleate | | | | | | | | | |
| Copolymer | (1) (meth) acrylic acid-methyl (meth) acrylate copolymer | 0.45 | | 0.3 | 0.53 | 0.6 | 0.72 | 0.35 | 0.15 | 0.45 |
| | (2) (meth) acrylic acid-ethyl (meth) acrylate copolymer | | 0.45 | | | | | | | |
| | (3) Crosslinking type acrylic acid polymer | | | | | | | | | |
| | (4) Crosslinking type acrylic acid-alkyl methacrylate copolymer | | | | | | | | | |
| Surfactant having acetylene bond | (5) Acetylenic glycol-based surfactant to which ethylene oxide is added Number of moles of ethylene oxide (EO) added: 7 HLB: 8 | | | | | | | | | |
| | (6) Acetylenic glycol-based surfactant to which ethylene oxide is added Number of moles of ethylene oxide (EO) added: 6 HLB: 12 | | | | | | | | | |
| | (7) Acetylenic glycol-based surfactant to which ethylene oxide and propylene oxide are added Number of moles of ethylene oxide (EO) added: 5. Number of moles of propylene oxide (PO) added: 2 HLB: 8 | | | | | | | | | |
| Silicone-based surfactant | (8) Silicone-based surfactant Mass average molecular weight 1500 SP value 10 | | | | | | | | | |
| | (9) Silicone-based surfactant Mass average molecular weight 600 | | | | | | | | | |
| | (10) Silicone-based surfactant Mass average molecular weight 4000 | | | | | | | | | |

TABLE 1-continued

|  |  | Examples | | | | | | | | |
|---|---|---|---|---|---|---|---|---|---|---|
|  |  | 1 | 2 | 3 | 4 | 5 | 6 | 7 | 8 | 9 |
| Organic resin particles | (11) Low density polyethylene dispersion Average particle size 6 μm. Solid content 40% |  |  |  |  |  |  |  |  | 0.5 |
|  | (12) Polyethylene paraffin wax Average particle size 1 μm. Solid content 46% |  |  |  |  |  |  |  |  |  |
|  | (13) Polyethylene wax dispersion Average particle size 2 μm. Solid content 8% |  |  |  |  |  |  |  |  |  |
|  | (14) Melamine formaldehyde condense particles Average particle size 0.6 μm. Having amino group |  |  |  |  |  |  |  |  |  |
| Dextrin | (15) Dextrin Mass average molecular weight: 100000 |  |  |  |  |  |  |  |  | 1 |
|  | (15) Dextrin Mass average molecular weight: 30000 |  |  |  |  |  |  |  |  |  |
|  | Total | 100 | 100 | 100 | 100 | 100 | 100 | 100 | 100 | 100 |
| Ink viscosity (mPa · s) 20° C. | Shear rate 1 92 sec - 1 | 2778 | 2637 | 333 | 5027 | 6554 | 8461 | 1114 | 102 | 2882 |
|  | Shear rate 3 84 sec - 1 | 1459 | 1504 | 230 | 2783 | 3616 | 4493 | 890 | 83 | 1502 |
|  | Shear rate 38 4 sec - 1 | 211 | 215 | 61 | 403 | 640 or more | 640 or more | 216 | 54 | 228 |
|  | Shear rate 192 sec - 1 | 74 | 74 | 29 | 128 or more | 128 or more | 128 or more | 90 | 36 | 78 |
|  | n value (192 sec - 1/1 92 sec - 1) | 0.21 | 0.22 | 0.47 | — | — | — | 0.45 | 0.77 | 0.22 |
| Evaluation | Ink stability | A | A | A | A | A | A | A | A | A |
|  | Writability test 1 | S | S | A | S | S | S | S | B | S |
|  | Writability test 2 | A | A | A | A | B | B | A | A | A |
|  | Written trace drying property | B | B | B | B | B | B | B | B | B |
|  | Feeling of writing | A | A | A | B | B | B | A | A | A |
|  | Ink leakage test | A | A | B | A | A | A | A | B | S |
|  | Overall evaluation | S | S | A | S | A | B | S | B | S |

TABLE 2

|  |  | Examples | | | | | | | | |
|---|---|---|---|---|---|---|---|---|---|---|
|  |  | 10 | 1 1 | 12 | 13 | 14 | 15 | 16 | 17 | 18 |
| Coloring agent | Carbon black | 6 | 6 | 6 | 6 | 6 | 6 | 6 | 6 | 6 |
| Coloring agent | Colored resin particles |  |  |  |  |  |  |  |  |  |
|  | Ion exchanged water | 79.05 | 77.15 | 76.65 | 77.15 | 77.35 | 77.55 | 77.35 | 77.35 | 77.15 |
| Water-soluble organic solvent | Diethylene glycol | 10 | 10 | 10 | 10 | 10 | 10 | 10 | 10 | 10 |
| pH adjuster | Triethanolamine | 3 | 3 | 3 | 3 | 3 | 3 | 3 | 3 | 3 |
| Antiseptic | Benzotriazole | 0.5 | 0.5 | 0.5 | 0.5 | 0.5 | 0.5 | 0.5 | 0.5 | 0.5 |
| Lubricant | Phosphoric acid ester (lauryl alcohol-based) | 1 | 1 | 1 | 1 | 1 | 1 | 1 | 1 | 1 |
| Crosslinking agent | Polyoxyethylene tetraoleate |  |  |  |  |  |  |  |  |  |
| Copolymer | (1) (meth) acrylic acid- methyl (meth) acrylate copolymer |  | 0.35 | 0.35 | 0.35 | 0.35 | 0.35 | 0.35 | 0.35 | 0.35 |
|  | (2) (meth) acrylic acid- ethyl (meth) acrylate copolymer | 0.45 |  |  |  |  |  |  |  |  |
|  | (3) Crosslinking type acrylic acid polymer |  |  |  |  |  |  |  |  |  |
|  | (4) Crosslinking type acrylic acid-alkyl methacrylate copolymer |  |  |  |  |  |  |  |  |  |
| Surfactant having acetylene bond | (5) Acetylenic glycol-based surfactant to which ethylene oxide is added Number of moles of ethylene oxide (EO) added: 7 HLB: 8 |  |  |  |  |  |  | 0.3 |  |  |
|  | (6) Acetylenic glycol-based surfactant to which ethylene oxide is added Number of moles of ethylene oxide (EO) added: 6 HLB: 12 |  |  |  |  |  |  |  | 0.3 |  |
|  | (7) Acetylenic glycol-based surfactant to which ethylene oxide and propylene oxide are added Number of moles of ethylene oxide (EO) added: 5. Number of moles of propylene oxide (PO) added: 2 HLB: 8 |  | 1 | 1 | 0.5 | 0.3 | 0.5 |  |  |  |
| Silicone-based surfactant | (8) Silicone-based surfactant Mass average molecular weight 1500 SP value 10 |  |  |  |  |  |  |  |  | 1 |
|  | (9) Silicone-based surfactant Mass average molecular weight 600 |  |  |  |  |  |  |  |  |  |
|  | (10) Silicone-based surfactant Mass average molecular weight 4000 |  |  |  |  |  |  |  |  |  |

TABLE 2-continued

|  |  | Examples | | | | | | | | |
|---|---|---|---|---|---|---|---|---|---|---|
|  |  | 10 | 11 | 12 | 13 | 14 | 15 | 16 | 17 | 18 |
| Organic resin particles | (11) Low density polyethylene dispersion Average particle size 6 μm. Solid content 40% | 0.5 |  | 0.5 |  |  |  | 0.5 | 0.5 |  |
|  | (12) Polyethylene paraffin wax Average particle size 1 μm. Solid content 46% |  |  |  |  | 0.5 |  |  |  |  |
|  | (13) Polyethylene wax dispersion Average particle size 2 μm. Solid content 8% |  |  |  |  |  | 0.5 |  |  |  |
|  | (14) Melamine formaldehyde condense particles Average particle size 0.6 μm. Having amino group |  |  |  | 0.5 |  |  |  |  |  |
| Dextrin | (15) Dextrin Mass average molecular weight: 100000 |  | 1 | 1 | 1 | 1 |  | 1 |  | 1 |
|  | (15) Dextrin Mass average molecular weight: 30000 | 1 |  |  |  |  | 1 |  | 1 |  |
|  | Total | 100 | 100 | 100 | 100 | 100 | 100 | 100 | 100 | 100 |
| Ink viscosity (mPa·s) 20° C. | Shear rate 1.92 sec - 1 | 2742 | 1026 | 1028 | 1054 | 1078 | 1101 | 1088 | 1083 | 1086 |
|  | Shear rate 3.84 sec - 1 | 1541 | 820 | 821 | 864 | 887 | 883 | 890 | 840 | 867 |
|  | Shear rate 38.4 sec - 1 | 231 | 202 | 202 | 207 | 212 | 216 | 212 | 218 | 211 |
|  | Shear rate 192 sec - 1 | 78 | 84 | 86 | 86 | 89 | 91 | 89 | 83 | 87 |
|  | n value (192 sec - 1/1 92 sec - 1) | 0.23 | 0.46 | 0.46 | 0.46 | 0.46 | 0.46 | 0.46 | 0.44 | 0.45 |
| Evaluation | Ink stability | A | A | A | A | A | A | A | A | A |
|  | Writability test 1 | S | S | S | S | S | S | S | S | S |
|  | Writability test 2 | A | A | A | A | A | A | A | A | A |
|  | Written trace drying property | B | S+ | S+ | S+ | S+ | S+ | S | A | S+ |
|  | Feeling of writing | A | S | S | S | S | S | S | S | S |
|  | Ink leakage test | S | B | S | A | A | A | S | S | B |
|  | Overall evaluation | S | S | S+ | S+ | S+ | S+ | S | S | S |

TABLE 3

|  |  | Examples | | | | | | | Comparative Examples | |
|---|---|---|---|---|---|---|---|---|---|---|
|  |  | 19 | 20 | 21 | 22 | 23 | 24 | 25 | 1 | 2 |
| Coloring agent | Carbon black | 6 | 6 | 6 | 6 | 6 | 6 | 6 | 6 | 6 |
| Coloring agent | Colored resin particles |  |  |  |  |  |  |  |  |  |
|  | Ion exchanged water | 76.65 | 77.35 | 77.55 | 77.55 | 77.35 | 75.6 | 75.6 | 79.05 | 79.05 |
| Water-soluble organic solvent | Diethylene glycol | 10 | 10 | 10 | 10 | 10 | 10 | 10 | 10 | 10 |
| pH adjuster | Triethanolamine | 3 | 3 | 3 | 3 | 3 | 3 | 3 | 3 | 3 |
| Antiseptic | Benzotriazole | 0.5 | 0.5 | 0.5 | 0.5 | 0.5 | 0.5 | 0.5 | 0.5 | 0.5 |
| Lubricant | Phosphoric acid ester (lauryl alcohol-based) | 1 | 1 | 1 | 1 | 1 | 1 | 1 | 1 | 1 |
| Crosslinking agent | Polyoxyethylene tetraoleate |  |  |  |  |  | 1.8 | 1.8 |  |  |
| Copolymer | (1) (meth) acrylic acid-methyl (meth) acrylate copolymer | 0.35 | 0.35 | 0.35 | 0.35 | 0.35 | 0.3 |  |  |  |
|  | (2) (meth) acrylic acid-ethyl (meth) acrylate copolymer |  |  |  |  |  |  | 0.3 |  |  |
|  | (3) Crosslinking type acrylic acid polymer |  |  |  |  |  |  |  |  | 0.45 |
|  | (4) Crosslinking type acrylic acid-alkyl methacrylate copolymer |  |  |  |  |  |  |  | 0.45 |  |
| Surfactant having acetylene bond | (5) Acetylenic glycol-based surfactant to which ethylene oxide is added Number of moles of ethylene oxide (EO) added: 7 HLB: 8 |  |  |  |  |  |  |  |  |  |
|  | (6) Acetylenic glycol-based surfactant to which ethylene oxide is added Number of moles of ethylene oxide (EO) added: 6 HLB: 12 |  |  |  |  |  |  |  |  |  |
|  | (7) Acetylenic glycol-based surfactant to which ethylene oxide and propylene oxide are added Number of moles of ethylene oxide (EO) added: 5. Number of moles of propylene oxide (PO) added: 2 HLB: 8 |  |  |  |  |  | 0.3 | 0.3 |  |  |
| Silicone-based surfactant | (8) Silicone-based surfactant Mass average molecular weight 1500 SP value 10 | 1 | 0.3 | 0 1 |  |  |  |  |  |  |
|  | (9) Silicone-based surfactant Mass average molecular weight 600 |  |  |  | 0.3 |  |  |  |  |  |
|  | (10) Silicone-based surfactant Mass average molecular weight 4000 |  |  |  |  | 0.3 |  |  |  |  |

TABLE 3-continued

|  |  | Examples | | | | | | | Comparative Examples | |
|---|---|---|---|---|---|---|---|---|---|---|
|  |  | 19 | 20 | 21 | 22 | 23 | 24 | 25 | 1 | 2 |
| Organic resin particles | (11) Low density polyethylene dispersion Average particle size 6 μm. Solid content 40% | 0.5 |  |  | 0.5 | 0.5 | 0.5 | 0.5 |  |  |
|  | (12) Polyethylene paraffin wax Average particle size 1 μm. Solid content 46% |  |  |  |  |  |  |  |  |  |
|  | (13) Polyethylene wax dispersion Average particle size 2 μm. Solid content 48% |  | 0.5 |  |  |  |  |  |  |  |
|  | (14) Melamine formaldehyde condense particles Average particle size 0.6 μm. Having amino group |  |  | 0.5 |  |  |  |  |  |  |
| Dextrin | (15) Dextrin Mass average molecular weight: 100000 | 1 |  |  | 1 |  | 1 | 1 |  |  |
|  | (15) Dextrin Mass average molecular weight: 30000 |  | 1 | 1 |  | 1 |  |  |  |  |
|  | Total | 100 | 100 | 100 | 100 | 100 | 100 | 100 | 100 | 100 |
| Ink viscosity (mPa · s) 20° C. | Shear rate 1.92 sec - 1 | 1086 | 1098 | 1128 | 1074 | 1144 | 553 | 561 | 781 | 1280 |
|  | Shear rate 3.84 sec - 1 | 868 | 871 | 878 | 881 | 893 | 389 | 392 | 531 | 826 |
|  | Shear rate 38.4 sec - 1 | 211 | 215 | 214 | 214 | 215 | 99 | 101 | 180 | 230 |
|  | Shear rate 192 sec - 1 | 86 | 88 | 89 | 83 | 87 | 48 | 50 | 97 | 113 |
|  | n value (192 sec - 1/1 92 sec - 1) | 0.45 | 0.45 | 0.45 | 0.44 | 0.44 | 0.47 | 0.48 | 0.55 | 0.47 |
| Evaluation | Ink stability | A | A | A | A | A | A | A | A | A |
|  | Writability test 1 | S | S | S | S | S | S | S | A | A |
|  | Writability test 2 | A | A | A | A | A | A | A | B | B |
|  | Written trace drying property | S+ | S+ | S+ | S | A | S+ | S+ | B | C |
|  | Feeling of writing | S | S | S | S | S | S | S | B | B |
|  | Ink leakage test | S | A | A | S | S | S | S | B | A |
|  | Overall evaluation | S+ | S+ | S+ | S | s | S+ | S+ | B | B |

(1) (Meth)acrylic acid-methyl (meth)acrylate copolymer (molar ratio of carboxylic acid to ethyl ester 1:2.1, molar ratio of repeating unit derive from acrylic acid to repeating unit derived from methacrylic acid 1:0.36)

(2) (Meth)acrylic acid-ethyl (meth)acrylate copolymer (molar ratio of carboxylic acid to ethyl ester 1:1, molar ratio of repeating unit derived from acrylic acid to repeating unit derived from methacrylic acid 1:0.82)

(3) Crosslinking type acrylic acid polymer (HIVISWAKO 104, available from Wako Pure Chemical Industries, Ltd.)

(4) Crosslinking type acrylic acid-alkyl methacrylate copolymer (Pemulen TR1, alkyl having 10 to 30 carbon atoms, available from The Lubrizol Corporation)

(5) Acetylenic glycol-based surfactant to which ethylene oxide is added

Number of moles of ethylene oxide (EO) added: 7, HLB: 8 (available from Nissin Chemical Industry Co., Ltd.)

(6) Acetylenic glycol-based surfactant to which ethylene oxide is added

Number of moles of ethylene oxide (EO) added: 6, HLB: 12

(available from Air Products and Chemicals, Inc.)

(7) Acetylenic glycol-based surfactant to which ethylene oxide and propylene oxide are added Number of moles of ethylene oxide (EO) added: 5, number of moles of propylene oxide (PO) added: 2, HLB: 8

(available from Air Products and Chemicals, Inc.)

(8) Silicone-based surfactant, mass average molecular weight: 1500, SP value: 10

(BYK345, available from BYK Chemie Co., Ltd.)

(9) Silicone-based surfactant, mass average molecular weight: 600

(CoatOSil 7608, available from Momentive Performance Materials Inc.)

(10) Silicone-based surfactant, mass average molecular weight: 4000

(CoatOSil 7604, available from Momentive Performance Materials Inc.)

(11) Low density polyethylene dispersion, average particle size: 6 μm, solid content: 40%

(Chemipearl M200, available from Mitsui Chemicals, Inc.)

(12) Polyethylene paraffin wax, average particle size: 1 μm, solid content: 46%

(NOPCOMUL MS40, available from San Nopco Limited)

(13) Polyethylene wax dispersion, average particle size: 2 μm, solid content: 48%

(NOPCO 1245-M-SN, available from San Nopco Limited)

(14) Melamine formaldehyde condense particles, average particle size: 0.6 μm, having an amino group (Epostar S8, available form Nippon Shokubai Co., Ltd.)

(15) Sandec series, available from Sanwa Starch Co., Ltd.

(mass average molecular weight: 100000)

Examples 26 to 31

Ink compositions were obtained in the same manner as in Example 1 except for changing the composition of the ink composition to the compositions shown in Table 4.

Comparative Examples 3 and 4

Ink compositions were obtained in the same manner as in Example 1 except for changing the composition of the ink composition to the compositions shown in Table 4.

TABLE 41

|  |  | Examples |  |  |  |  |  | Comparative Examples |  |
|---|---|---|---|---|---|---|---|---|---|
|  |  | 26 | 27 | 28 | 29 | 30 | 31 | 3 | 4 |
| Coloring agent | Carbon black |  |  |  |  |  |  |  |  |
| Coloring agent | Colored resin particles | 10 | 10 | 10 | 10 | 10 | 10 | 10 | 10 |
|  | Ion exchanged water | 74.96 | 73.16 | 73.16 | 71.36 | 73.16 | 71.36 | 75.05 | 75.05 |
| Water-soluble organic solvent | Diethylene glycol | 10 | 10 | 10 | 10 | 10 | 10 | 10 | 10 |
| pH adjuster | Triethanolamine | 3 | 3 | 3 | 3 | 3 | 3 | 3 | 3 |
| Antiseptic | Benzotriazole | 0.5 | 0.5 | 0.5 | 0.5 | 0.5 | 0.5 | 0.5 | 0.5 |
| Lubricant | Phosphoric acid ester (lauryl alcohol-based) | 1 | 1 | 1 | 1 | 1 | 1 | 1 | 1 |
| Crosslinking agent | Polyoxyethylene tetraoleate |  | 1.8 |  | 1.8 |  | 1.8 |  |  |
| Copolymer | (1) (meth) acrylic acid-methyl (meth) acrylate copolymer | 0.54 |  | 0.54 |  | 0.54 |  |  |  |
|  | (2) (meth) acrylic acid-ethyl (meth) acrylate copolymer |  | 0.54 |  | 0.54 |  | 0.54 |  |  |
|  | (3) Crosslinking type acrylic acid polymer |  |  |  |  |  |  |  | 0.45 |
|  | (4) Crosslinking type acrylic acid-alkyl methacrylate copolymer |  |  |  |  |  |  | 0.45 |  |
| Surfactant having acetylene bond | (5) Acetylenic glycol-based surfactant to which ethylene oxide is added Number of moles of ethylene oxide (EO) added: 7 HLB: 8 |  |  |  |  |  |  |  |  |
|  | (6) Acetylenic glycol-based surfactant to which ethylene oxide is added Number of moles of ethylene oxide (EO) added: 6 HLB: 12 |  |  |  |  |  |  |  |  |
|  | (7) Acetylenic glycol-based surfactant to which ethylene oxide and propylene oxide are added Number of moles of ethylene oxide (EO) added: 5. Number of moles of propylene oxide (PO) added: 2 HLB: 8 |  |  | 0.3 | 0.3 |  |  |  |  |
| Silicone-based surfactant | (8) Silicone-based surfactant Mass average molecular weight 1500 SP value 10 |  |  |  |  | 0.3 |  |  |  |
|  | (9) Silicone-based surfactant Mass average molecular weight 600 |  |  |  |  |  | 0.3 |  |  |
|  | (10) Silicone-based surfactant Mass average molecular weight 4000 |  |  |  |  |  |  |  |  |
| Organic resin particles | (11) Low density polyethylene dispersion Average particle size 6 μm. Solid content 40% |  | 0.5 | 0.5 | 0.5 | 0.5 |  |  |  |
|  | (12) Polyethylene paraffin wax Average particle size 1 μm. Solid content 46% |  |  |  |  |  |  |  |  |
|  | (13) Polyethylene wax dispersion Average particle size 2 μm. Solid content 48% |  |  |  |  |  |  |  |  |
|  | (14) Melamine formaldehyde condense particles Average particle size 0.6 μm. Having amino group |  |  |  |  |  |  |  |  |
| Dextrin | (15) Dextrin Mass average molecular weight: 100000 |  | 1 | 1 | 1 | 1 |  |  |  |
|  | (15) Dextrin Mass average molecular weight: 30000 |  |  |  |  |  |  |  |  |
|  | Total | 100 | 100 | 100 | 100 | 100 | 100 | 100 | 100 |
| Ink viscosity (mPa · s) 20° C. | Shear rate 1.92 sec - 1 | 717 | 1254 | 702 | 1211 | 711 | 1231 | — | — |
|  | Shear rate 3.84 sec - 1 | 634 | 1069 | 618 | 1048 | 624 | 1055 | — | — |
|  | Shear rate 38.4 sec - 1 | 224 | 280 | 208 | 282 | 218 | 273 |  |  |
|  | Shear rate 192 sec - 1 | 91 | 106 | 87 | 101 | 90 | 103 |  |  |
|  | n value (192 sec - 1/1 92 sec - 1) | 0.55 | 0.46 | 0.55 | 0.46 | 0.55 | 0.46 |  |  |
| Evaluation | Ink stability | A | A | A | A | A | A | C (Aggregated) | C (Aggregated) |
|  | Writability test 1 | A | S | A | S | A | S |  |  |
|  | Writability test 2 | A | A | A | A | A | A |  |  |
|  | Written trace drying property | B | B | S | S | S | S |  |  |
|  | Feeling of writing | A | A | S | S | S | S |  |  |
|  | Ink leakage test | B | A | S | S | S | S |  |  |
|  | Overall evaluation | B | A | S | S | S | S | C | C |

Ink stability test: the ink compositions of Examples 1 to 31 and Comparative Examples 1 to 4 are each placed in a 50-mL screw tube, and aged at 50° C. for two months, and then the state thereof was observed by a microscope.

A: no aggregation of coloring agent is observed while maintaining an initial state, and ink stability is favorable B: slight aggregation of coloring agent and slight supernatant are observed, and ink stability was slightly poor C: aggregation of coloring agent, and the like are observed without maintaining an initial state, and ink stability is poor A refill (1.0 g), in which the ink compositions of Examples 1 to 31 and Comparative Examples 1 and 2 were filled in an ink accommodation cylinder (made from polypropylene) equipped with a ball point pen tip (ball diameter: 0.7 mm, arithmetic average roughness (Ra) of the ball surface: 1 nm) having a ball diameter of 0.7 mm and rotatably holding a ball, at the leading end of the ink accommodation cylinder through a tip holder, was mounted on a gel ink ballpoint pen (trade name: G-2), available from Pilot Corporation, and the following tests and evaluation were performed.

Writability test 1: writing was performed on a writing paper A with a gel ink ballpoint pen using the ink compositions of Examples 1 to 31 and Comparative Examples 1 and 2 at a writing angle of 65° and a writing rate of 4 m/min, and then the state of bleeding of the written trace at that time was visually observed.

S: no bleeding is observed in the written trace, and a favorable written trace is obtained.

A: slight bleeding is observed in the written trace, but a favorable written trace is obtained.

B: bleeding is observed in the written trace, but a practically nonproblematic written trace is obtained.

C: bleeding of the written trace is significant, and the written trace is practically problematic.

Writability test 2: writing was performed on a writing paper A with a gel ink ballpoint pen using the ink compositions of Examples 1 to 31 and Comparative Examples 1 and 2 at a writing angle of 65° and a writing rate of 4 m/min, and then the state of line splitting of the written trace at that time was visually observed.

A: no line splitting is observed in the written trace, and a uniform and favorable written trace is obtained.

B: line splitting is observed in the written trace, but a practically nonproblematic written trace is obtained.

C: line splitting of the written trace is significant, and the written trace is a practically problematic.

Written trace drying property test: writing was performed on a writing paper A with a gel ink ballpoint pen using the ink compositions of Examples 1 to 31 and Comparative Examples 1 and 2, after which the written trace was rubbed with a piece of tissue paper every lapse of time, and the state of the written trace was evaluated for the written trace drying property in accordance with the following criteria.

S+: written trace dried in less than 3 seconds after writing was performed

S: written trace dried in 3 seconds or more and less than 5 seconds after writing was performed A: written trace dried in 5 seconds or more and less than 10 seconds after writing was performed B: written trace was dried in 10 seconds or more and less than 20 seconds after writing was performed C: written trace did not dry even when 20 seconds has passed after writing was performed Feeling of writing: a sensory test by handwriting was conducted with a gel ink ballpoint pen using the ink compositions of Examples 1 to 31 and Comparative Examples 1 and 2.

S: feeling of writing was very smooth

A: feeling of writing was smooth

B: feeling of writing was slightly heavy, but was practically nonproblematic level C: feeling of writing was heavy and not smooth and poor Ink leakage test: for each of the gel ink ballpoint pens using the ink compositions of Examples 1 to 31 and Comparative Examples 1 and 2, a 40 g of weight is attached to a shaft portion of the a water-based ballpoint pen for a test, then a ball point pen tip was protruded downwardly and the state was kept in which the ball of the ball point pen tip is in contact with the bottom of the ballpoint pen display case, and allowed to stand in an environment at 20° C. and 65% RH for one day, and the amount of ink leakage from the leading end of the ball point pen tip was measured.

S: the amount of ink leakage is less than 5 mg.

A: the amount of ink leakage is 5 to 15 mg.

B: the amount of ink leakage is more than 15 mg and less than 30 mg.

C: the amount of ink leakage is 30 mg or more.

In general, to suppress ink leakage, the ball point pen tip of a water-based gel ballpoint pen preferably equips with a valve mechanism in which a ball rotatably held at the leading end of the ball point pen tip is pressed on the inner wall of a leading tip end directly or through a pressing member by a resilient member such as a coil spring, thus providing a gap between the inner wall of the leading tip end and the ball by the pressing force during writing to cause the ink to flow out, and the minute gap at the leading tip end is preferably closed when it is not used.

As shown in (Table 1) to (Table 3), the ink compositions of Examples 1 to 4, 7, and 9 to 25 had a large viscosity gradient during rest (shear rate: 1.92 $sec^{-1}$) and during high shearing (shear rate: 192 $sec^{-1}$), and exhibited both excellent dispersion stability and writability In addition, in Examples 5 and 6, although line splitting was partially observed in the written trace, the results as for bleeding were excellent. In Comparative Examples 1 and 2, particularly, the viscosity during high shearing was high compared to Examples 1 to 3 and 9 to 25, and therefore line splitting was observed in writing and the writing performance was inferior. In (Table 4), the ink compositions of Examples 26 to 31 exhibited excellent dispersion stability and writability; however, the ink compositions of Comparative Examples 3 and 4 showed aggregation therein and was inferior in the dispersion stability, and therefore could not be used as a water-based ink composition for a ballpoint pen. In particular, in Examples 27, 29, and 31 which used a crosslinking agent, a higher viscosity was obtained compared to a case where the crosslinking agent was not added, and a high viscosity gradient and an excellent shear thinning property were achieved.

As described above, it was found that the ink compositions of Examples 1 to 31 and the water-based ballpoint pens using the ink compositions exhibited favorable performance by using a specific copolymer.

From the results of (Table 1) to (Table 4), the results of the written trace drying property test were favorable in Examples 11 to 25. Moreover, the results of the ink leakage test were favorable in Examples 9, 10, 12 to 17, and 19 to 25 in which organic fine particles were blended. Further, in Examples 1 to 3, and 7 to 31, a performance of feeling of writing at a favorable level was obtained.

INDUSTRIAL APPLICABILITY

The water-based ink composition for a ballpoint pen of the present invention can be used as writing instrument such as various types of markers as well as ball point pens of cap-type and knock-type and the like.

The invention claimed is:

1. A water-based ink composition for a ballpoint pen comprising:
  water;
  a coloring agent; and
  a copolymer obtained by copolymerizing a monomer represented by the following formula (1) and a monomer represented by the following formula (2):

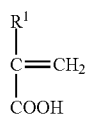

(1)

wherein $R^1$ is hydrogen or a methyl group;

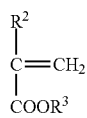

(2)

wherein $R^2$ is hydrogen or a methyl group, and $R^3$ is a methyl group or an ethyl group, and
wherein a ratio of a repeating unit derived from acrylic acid to a repeating unit derived from methacrylic acid in the copolymer is 1:0.01 to 1:5 in terms of molar ratio.

2. The composition according to claim 1, wherein the copolymer comprises:
a repeating unit represented by the following formula (i):

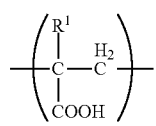

(i)

wherein $R^1$ is hydrogen or a methyl group; and
a repeating unit represented by the following formula (ii):

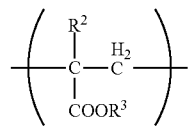

(ii)

wherein $R^2$ is hydrogen or a methyl group, and $R^3$ is a methyl group or an ethyl group.

3. The composition according to claim 2, wherein a ratio of the repeating unit represented by formula (i) to the repeating unit represented by formula (ii) is 1:0.05 to 1:10 in terms of number ratio.

4. The composition according to claim 1, wherein a mass average molecular weight of the copolymer is 1,000 or more and 100,000 or less.

5. The composition according to claim 1, wherein a blended amount of the copolymer is 0.01 to 10 mass % based on the total mass of the composition.

6. The composition according to claim 1, wherein the copolymer is a shear-thinning imparting agent.

7. The composition according to claim 1, further comprising a surfactant having an acetylene bond in its structure, or a silicone-based surfactant.

8. The composition according to claim 7, wherein a blended amount of the surfactant having an acetylene bond in its structure or the silicone-based surfactant is 0.01 to 3.0 mass % based on the total mass of the composition.

9. The composition according to claim 7, wherein a number of moles of ethylene oxide added of the surfactant having an acetylene bond in its structure is 10 or less.

10. The composition according to claim 7, wherein a mass average molecular weight of the silicone-based surfactant is 500 to 3,000.

11. The composition according to claim 1, further comprising an organic resin particle.

12. The composition according to claim 1, further comprising dextrin.

13. A water-based ballpoint pen comprising the water-based ink composition for a ballpoint pen according to claim 1.

14. The composition according to claim 1, wherein a blended amount of the copolymer is 0.1 to 2 mass % based on the total mass of the composition.

* * * * *